(12) United States Patent
Namai (10) Patent No.: US 6,980,370 B2
(45) Date of Patent: Dec. 27, 2005

(54) LENS DEVICE OF A CAMERA HAVING A ZOOM LENS, AND ZOOM CAMERA

(75) Inventor: Akihiro Namai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/456,267

(22) Filed: Jun. 6, 2003

(65) Prior Publication Data

US 2004/0027686 A1 Feb. 12, 2004

(30) Foreign Application Priority Data

Jun. 10, 2002 (JP) .................................... 2002/168316

(51) Int. Cl.[7] ............................................. G02B 15/14
(52) U.S. Cl. .................... 359/694; 359/696; 359/701
(58) Field of Search ............................. 359/696, 697, 359/698, 701, 823, 694; 396/379, 76, 85, 121

(56) References Cited

U.S. PATENT DOCUMENTS 6,266,486 B1 * 7/2001 Kohno ........................ 396/72

2002/0141074 A1 * 10/2002 Nakane ...................... 359/699
2002/0141081 A1 * 10/2002 Onda ......................... 359/823
2004/0027687 A1 * 2/2004 Bittner et al. ............... 359/694

* cited by examiner

Primary Examiner—Georgia Epps
Assistant Examiner—M. Hasan
(74) Attorney, Agent, or Firm—Cowan, Liebowitz & Latman, P.C.

(57) ABSTRACT

Even if a stop position during focus adjustment becomes irregular, it is made possible to focus on an object, and also a circuit construction for the focus adjustment can be simplified to thereby make the cost low. For this purpose, the lens device has a zoom lens comprising a plurality of lens units, and a lens driving member for operating the plurality of lens units for the adjustment of zoom and focus, and the lens driving member has at least first areas 20a, 20c continuing to focus on a first object distance and second areas 20b, 20d continuing to focus on a second object distance on a shorter distance side than the first object distance, within a predetermined range in the operating process of the plurality of lens units for the zoom adjustment.

5 Claims, 14 Drawing Sheets

100 # LENS DEVICE OF A CAMERA HAVING A ZOOM LENS, AND ZOOM CAMERA

BACKGROUND OF THE INVENTION

1. Field of the Invention

This invention relates, for example, to an image pickup apparatus such as an electronic camera and an image pickup method applied thereto.

2. Description of Related Art

There have heretofore been made various propositions regarding the focus control of the zoom lens of a camera. They will be briefly described hereinafter with reference to FIGS. 13 and 14 of the accompanying drawings.

Figure 13:
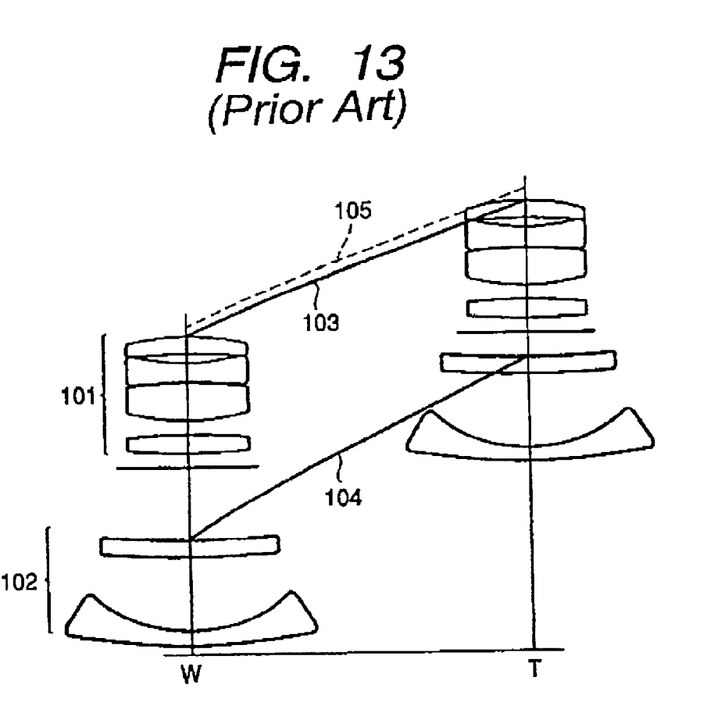
FIG. 13 shows an example of the operations of a one-unit lens and a two-unit lens according to the prior art.

FIG. 13 shows the manner in which a conventional two-unit type zoom lens is operated from a wide state to a telephoto state.

Figure 14:
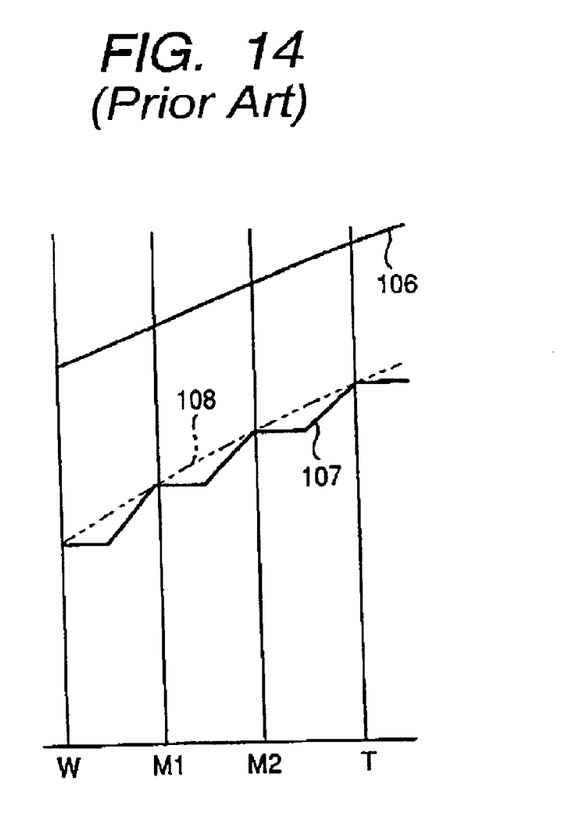
FIG. 14 shows another example of the operations of a one-unit lens and a two-unit lens according to the prior art.

In FIG. 13, the reference numeral 101 designates a one-unit lens, and the reference numeral 102 denotes a two-unit lens. In FIG. 14, each lens position indicated by W on the left side shows a wide (wide angle) state. Each lens position indicated by T on the right side shows the tele (telephoto) state. The reference numeral 103 designates a line indicating the operation locus of the one-unit lens 101. The reference numeral 104 denotes a line indicating the operation locus of the two-unit lens 102.

The fore lens focus type as shown in FIG. 13 is generally known. That is, it is a two-unit zoom type zoom lens. This has focus controlling means for being focused on an object distance. This can be axially moved by an amount corresponding to the object distance, e.g. to a position as indicated by 105 in FIG. 13.

Also, there has been proposed a step zoom lens barrel of a construction in which a focusing operation is adapted to be performed in the course of a zooming operation. This will be described with reference to FIG. 14. This corresponds to Japanese Patent Application Laid-Open No. 3-248110, Japanese Patent Application Laid-Open No. 6-313831, etc.

In FIG. 14, the reference numerals 106 and 107 designate lines indicating the operation loci of the one-unit lens and the two-unit lens, respectively, and the respective lenses are not shown.

A line denoted by the reference numeral 108 is the original operation locus of the two-unit lens. Describing the operation at the wide end indicated by W on the left side in FIG. 14, a zoom lens barrel is operated for focus control during photographing, and therewith, the one-unit lens is axially moved along the line of the operation focus indicated by 106. At this time, the two-unit lens is on the horizontal portion of the line indicating the operation locus 107 and therefore, is not axially moved. The one-unit lens alone is axially moved. Thereby, focus control corresponding to the object distance is effected in the wide state.

Also, during a zooming operation, the zoom lens barrel is axially moved to intermediate positions indicated by M1 and M2 and a tele position indicated by T. Regarding also the focus control at each zoom position, an operation similar to that in the aforedescribed wide state is performed.

In the conventional fore lens focus type shown in FIG. 13, however, there has been a problem as shown below. That is, a driving mechanism or an actuator for operating the one-unit lens besides the two-unit lens has become necessary, and there have been the possibility of the const rising due to an increase in the number of parts, and the possibility of the camera itself becoming bulky.

Also, in the conventional step zoom type shown in FIG. 14, the stop position control of the zoom lens barrel must be effected accurately and therefore, accurate position detection or the like during the operation has been necessary. Thus, a control circuit concerned in position detection has become complicated, and this has led to the possibility of the cost rising.

Further, Japanese Patent Application Laid-Open No. 8-94907 is shown as another example of the prior art. In this publication, there is also proposed a construction in which the step zoom type has respective waiting positions at respective zoom positions and a lens is moved from the respective waiting positions and further between infinity and a close range. Again in this example of the prior art, the stop position control of the zoom lens barrel during photographing must be effected accurately, and a control circuit has become complicated, and this has led to the possibility of the cost rising.

SUMMARY OF THE INVENTION

It is an object of the present invention to provide a low-cost lens device of a camera and a zoom camera which can be focused on an object to be photographed even if a stop position during focus adjustment becomes irregular and in which a circuit construction for focus adjustment can be simplified.

Other objects and advantages than those discussed above will be apparent to those skilled in the art from the description of a preferred embodiment of the invention which follows. In the description, reference is made to the accompanying drawings, which form a part hereof and which illustrate an example of the invention. Such example, however, is not exhaustive of the various embodiments of the invention and therefore, reference is made to the claims which follow the description for determining scope of the invention.

DETAILED DESCRIPTION OF THE
PREFERRED EMBODIMENTS

Some embodiments of the present invention will hereinafter be describe with reference to the drawings.

First Embodiment

Figure 1:
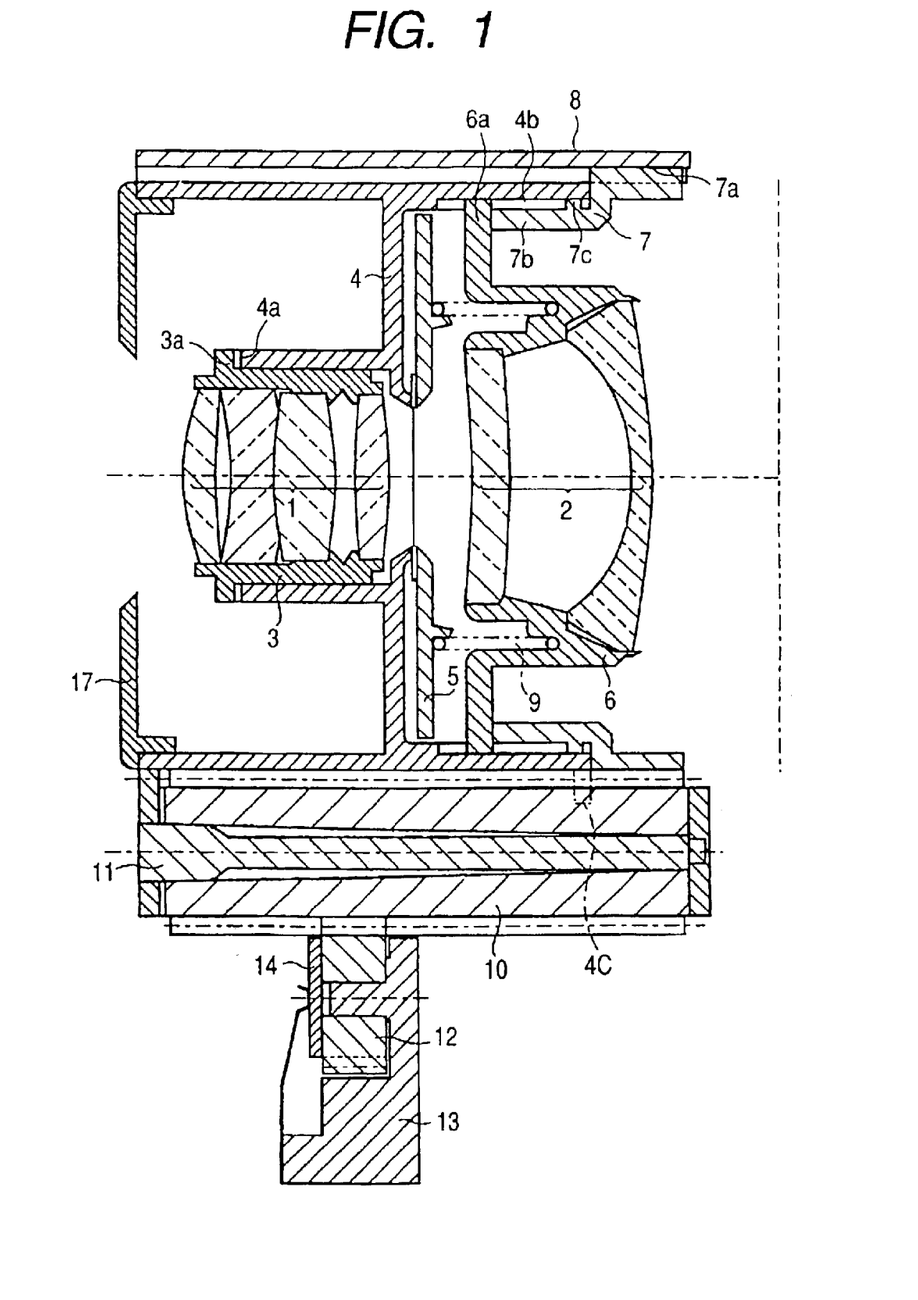
FIG. 1 is a lateral cross-sectional view showing the collapsed position of a lens barrel according to a first embodiment of the present invention.
Figure 2:
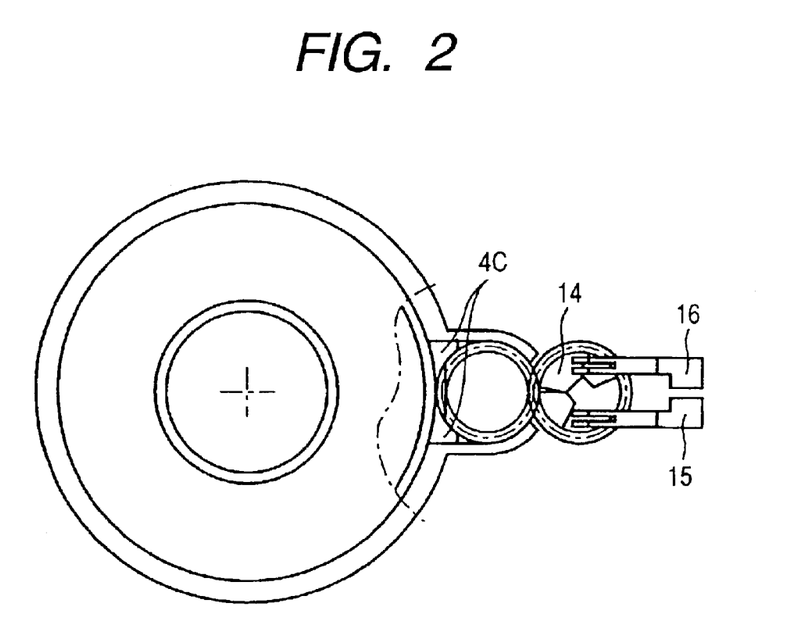
FIG. 2 is a front view of the lens barrel of FIG. 1.
Figure 3:
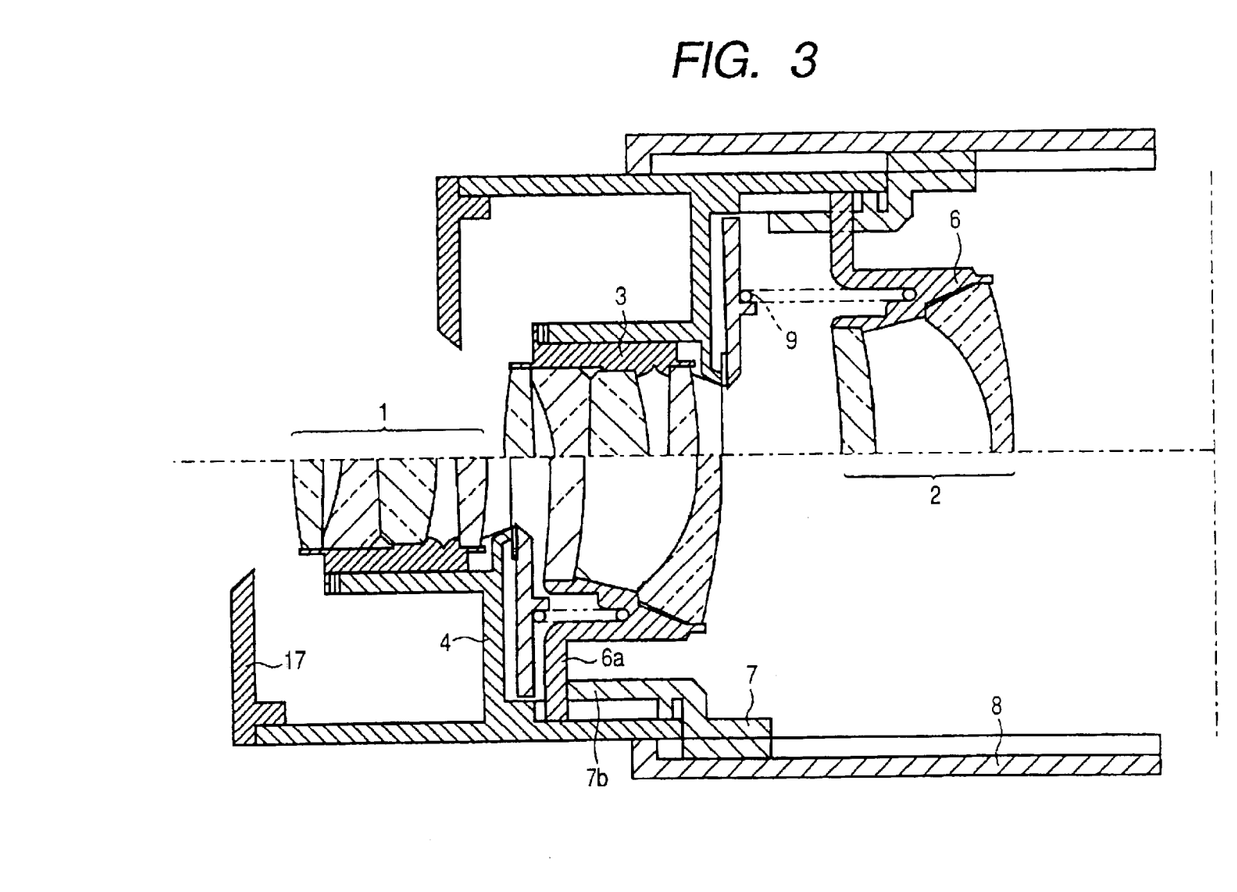
FIG. 3 is a longitudinal cross-sectional view of the lens barrel of FIG. 1.
Figure 4A:
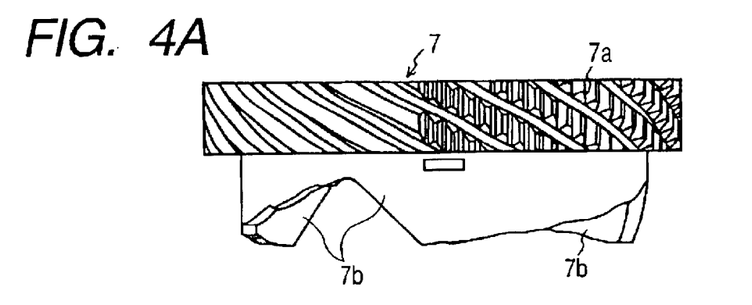
FIGS. 4A, 4B and 4C show the structure of a driving ring shown in FIG. 1.
Figure 4B:
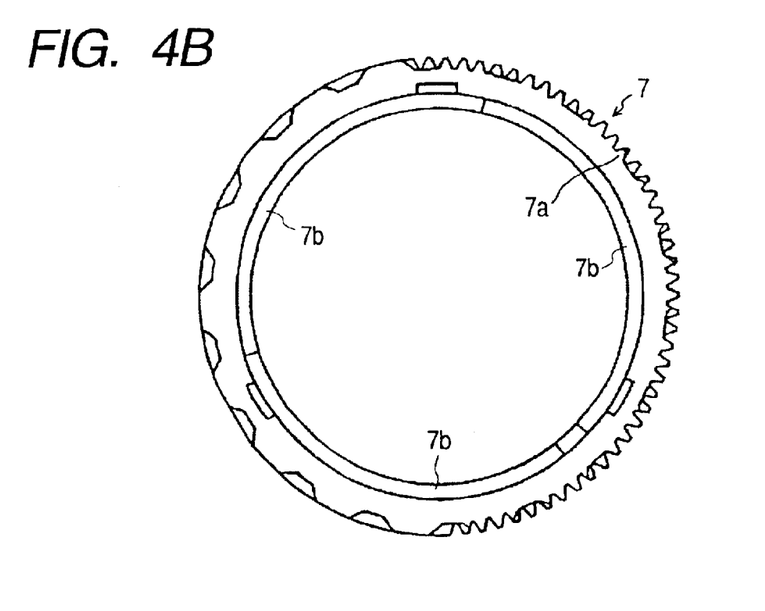
Figure 4C:
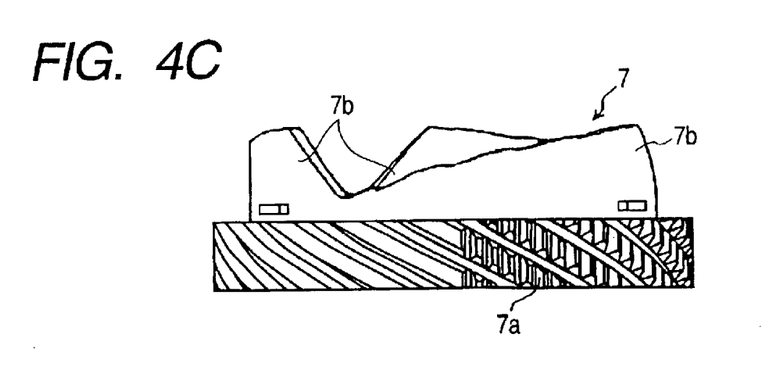
Figure 5:
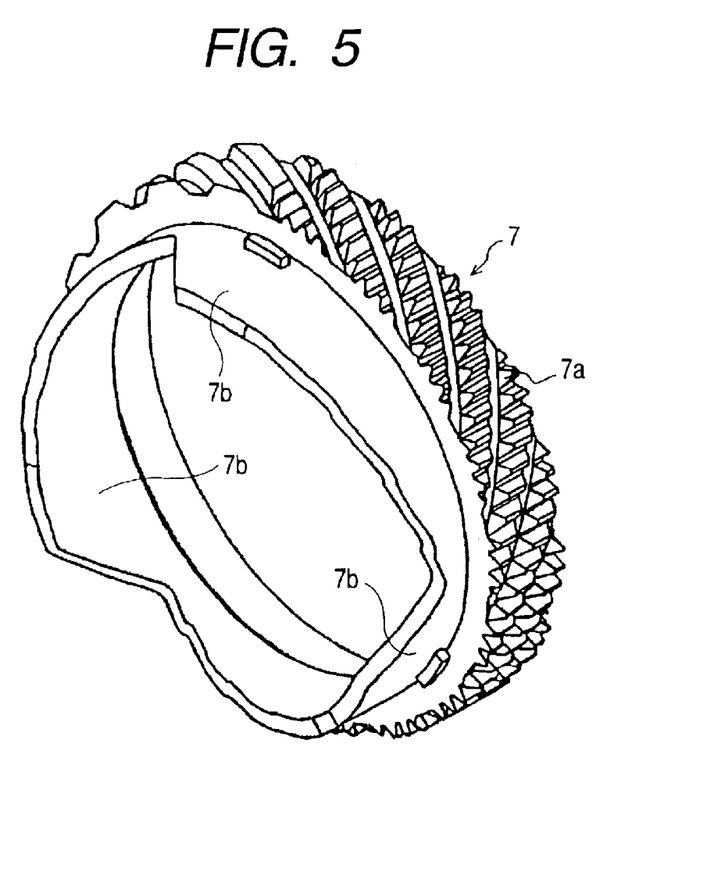
FIG. 5 is a perspective view showing the driving ring shown in FIG. 1.
Figure 6:
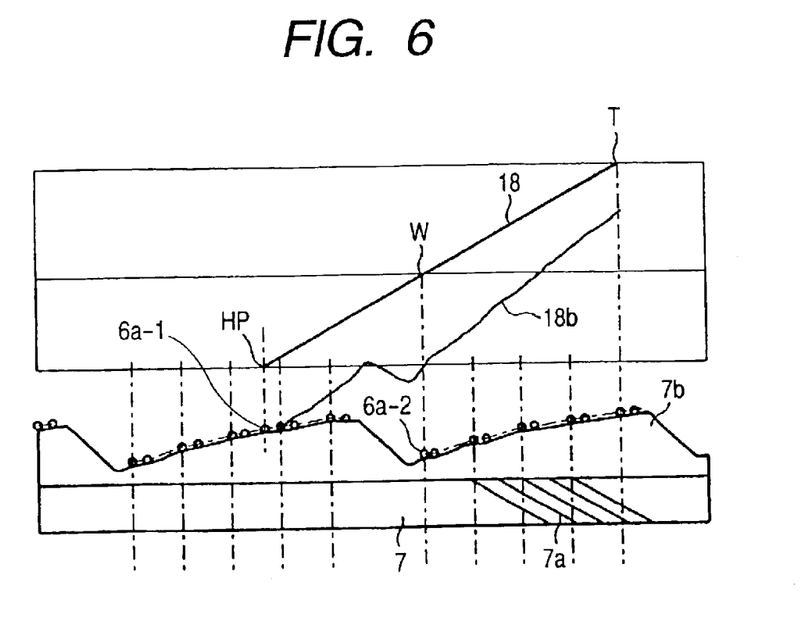
FIG. 6 is a developed view of the driving ring shown in FIG. 1.
Figure 7:
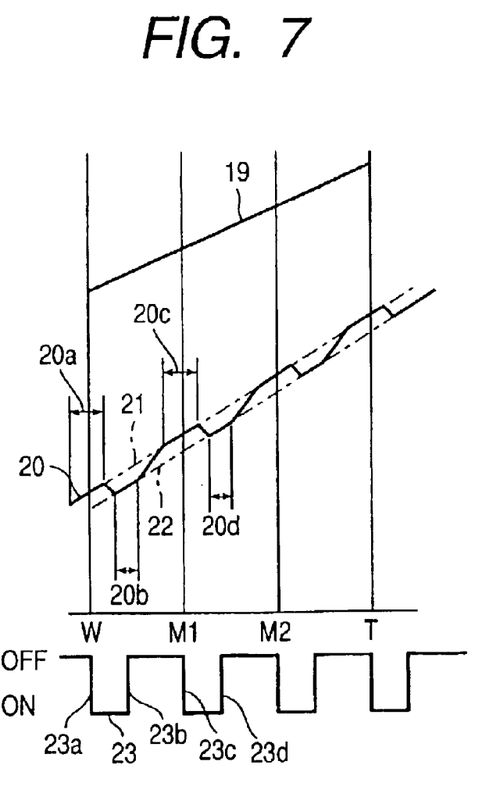
FIG. 7 shows the operations of a one-unit lens and a two-unit lens according to the first embodiment of the present invention.

FIGS. 1 to 7 show a first embodiment of the present invention. More particularly, FIG. 1 is a lateral cross-sectional view of the zoom lens barrel of a camera according to the first embodiment of the present invention, and FIG. 2 is a front view of the zoom lens barrel shown in FIG. 1. FIG. 3 is a longitudinal cross-sectional view of the zoom lens barrel shown in FIG. 1, and shows the wide state and tele state of the lens. FIGS. 4A, 4B and 4C show the structure of a driving ring, FIG. 5 is a perspective view of the driving ring, FIG. 6 is a developed view of the driving ring with a portion thereof omitted, and FIG. 7 shows the operations of a one-unit lens and a two-unit lens.

In FIGS. 1 to 7, the reference numeral designates the one-unit lens constituting the zoom lens, the reference numeral 2 denotes the two-unit lens, the reference numeral 3 designates a one-unit lens barrel in which the one-unit lens 1 is incorporated, and the reference numeral 4 denotes a zoom lens barrel. The one-unit lens barrel 3 is incorporated in the zoom lens barrel 4. Paul portions 3a provided, for example, at intervals of 120 degrees, and a tapered cam portion 4a provided on the zoom lens barrel 4 abut against and are assembled to the fore end of the one-unit lens barrel 3. Thus, design is made such that the one-unit lens barrel 3 is rotated, whereby focus adjustment during assembly is possible.

The reference numeral 5 designates a blade presser for pressing a shutter blade, not shown, and the reference numeral 6 denotes a two-unit lens barrel in which the two-unit lens 2 is incorporated. The reference numeral 7 designates the driving ring coupled to a stationary barrel 8 by a helicoid portion 7a, and mounted on the front and rear of the camera so as to be operated by rotation.

The driving ring 7 is provided with cam portions 7b as shown in FIGS. 4A, 4B and 4C, etc., three such cam portions 7b are provided at intervals of 120 degrees. The two-unit lens barrel 6 is urged against these cam portions 7b by a spring a through three arm portions 6a provided on the outer periphery of the two-unit lens barrel 6 at intervals of 120 degrees and further, the arm portions 6a of the two-unit lens barrel 6 have their rotation regulated by a rectilinear groove 4b formed in the zoom lens barrel 4. Also, the driving ring 7 is rotatably bayonet-coupled to the zoom lens barrel 4 by a pawl 7c provided on the outer periphery thereof, and the zoom lens barrel 4 has its rotation regulated by the arm portion 4c thereof being engaged with the rectilinear groove of the stationary barrel 8.

The reference numeral 10 denotes a driving gear rotatably mounted on the stationary barrel 8 by a shaft 11, and meshing with and coupled to a gear provided on the helicoid portion 7a of the driving ring 7 to thereby drive the driving ring 7. The reference numeral 12 designates an idler gear rotatably mounted on a zoom ground plate 13, and meshing with and coupled to the driving gear 10. The idler gear 12 is rotated by a zoom motor, not shown, through a zoom driving deceleration system, not shown. Also, a pulse substrate 14 is mounted on the idler gear 12 and rotates therewith.

The reference numerals 15 and 16 denote pulse contact pieces mounted on the zoom ground plate 13, and changed over to ON or OFF state by the rotation of the pulse substrate 14, and connected to the control circuit, not shown, of the camera. The reference numeral 17 designates the cover of the zoom lens barrel 4.

The operation of the camera will now be described.

FIG. 1 shows the waiting state (collapsed position) of the camera, and when the main switch, not shown, of the camera is closed, a zoom motor, not shown, is rotated, and the driving gear 10 is rotated through the zoom driving deceleration system, not shown, and the idler gear 12. When the driving gear 10 is rotated, the driving ring 7 is rotated, and the driving ring 7 is moved to the front of the camera while being rotated with the aid of the helicoid portion 7a thereof. Simultaneously with this operation, the zoom lens barrel 4 having its rotation regulated by the stationary barrel 8 is axially moved to the front of the camera, and the one-unit lens 1 is axially moved. Further, the two-unit lens 2 has its rotation regulated by the zoom lens barrel 4, and is axially moved to the front of the camera with the one-unit lens 1 while being operated relative to the one-unit lens 1 by the cam portion 7b of the driving ring 7 which will be described later. That is, each lens unit is axially moved from the waiting state of FIG. 1 to the wide state shown in the upper portion of FIG. 3.

In FIG. 6 which shows a developed view of the driving ring 7, the reference numeral 18 designates a line representative of the locus of the zoom lens barrel 4 axially moved by the helicoid portion 7a of the driving ring 7, and the reference character 18b denotes a line representative of the locus of the two-unit lens 2 operated by the cam portion 7b of the driving ring 7.

The aforedescribed operation is an operation from a waiting position HP (the state of FIG. 1) indicated by the line 18 to a wide position (the state shown in the upper portion of FIG. 3) indicated by W. By this operation, the two-unit lens barrel 6 has its arm portion 6a operated from the waiting position indicated by 6a-1 in FIG. 6 to the wide position indicated by 6a-2 by the cam portion 7b of the driving ring 7. Although the detailed shape of the cam is not shown in FIG. 6, the cam portion 7b, as will be described later with reference to FIG. 7, has a cam area for continuing to focus on an object (hereinafter referred to as the object at the bar point) farther than a prescribed object distance, and a cam area for continuing to focus on an object (hereinafter referred to as the object at the near point) nearer than the prescribed object distance, within a predetermined range, at each zoom position.

Also, in the process of this operation, the pulse substrate 14 mounted on the idler gear 12 is rotated and the pulse contact pieces 15 and 16 are switched on and off, and when a prescribed number of pulses are generated, it is judged to be the wide position, and the operation is stopped. In the present embodiment, the operation is stopped in a position whereat the pulse contact pieces are ON.

The zooming operation will now be described.

When the tele button of a zoom switch, not shown, is depressed from the wide state shown in the upper portion of FIG. 3, as in the aforedescribed operation, the driving ring 7 is rotated in the tele direction by the rotation of the zoom motor, not shown, and when the tele button is released, the operation is controlled so as to be stopped (the tele state shown in the lower portion of FIG. 3) when the ON signal of the pulse generated by the pulse substrate 14 and the pulse contact pieces 15, 16 has been generated.

Also, in a case where the arm portion 6a is operated from the tele state shown in the lower portion of FIG. 3 toward the wide state, the zoom motor, not shown, is reversely rotated and the driving ring 7 is rotated toward the wide state, and the ON signal of the pulse generated by the pulse substrate 14 and the pulse contact pieces 15, 16 is generated, and the arm portion 6a is operated until the ON signal becomes an OFF signal, whereafter the zoom motor is forwardly rotated to thereby rotate the driving ring 7 to the tele side, and the operation is stopped when the ON signal is generated again. Thereby, there is brought about the wide state show, for example, in the upper portion of FIG. 3.

The operation during photographing will now be described with reference to FIG. 7.

In the upper portion of FIG. 7, the reference numeral 19 designates a line indicating the operation locus of the one-unit lens 1, and the reference numeral 20 denotes a line indicating the operation locus of the two-unit lens 2. W designates a wide position, T denotes a tele position, and M1 and M2 designate zoom stop positions at the intermediate positions thereof. The upper portion of FIG. 7 omit and exageratedly depict the number of the intermediate positions, the amount of movement of the two-unit lens, etc. to make the description easy to understand.

The reference numeral 23 in the lower portion of FIG. 7 denotes the state of the pulse signal generated by the pulse substrate 14 and the pulse contact pieces 15, 16, and the upper part in FIG. 7 shows an OFF state and the lower part in FIG. 7 shows an OFF state. A dots-and-dash line shown as being superimposed on the line 20 of the operation locus of the two-unit lens 2 is a zoom cam curve in a case where no contrivance is made as in the present embodiment, and is a line designed to be focused on the object distance at the far point. Likewise, a dots-and-dash line 22 is a zoom cam curve designed to be focused on the near object distance, and is a line designed to be focused on a short distance nearer in object distance (relative to the object at the near point) than the line 21. The line 20 of the operation locus of the two-unit lens 2 is a line obtained by alternately linking the line 21 and the line 22 together. That is, the operation locus of the two-unit lens 2 is on the line 21 within the range 20a of the line 20 of the operation locus of the two-unit lens 2 and thus, it is focused on the object at the far point, and is on the line 22 within the range 20b and thus, it is focused on the object at the near point.

Here, the zoom lens barrel driver from the waiting position to the wide position (the state shown in the upper portions of FIG. 1→FIG. 3) by the ON operation of the main switch, not shown, of the camera is stopped by an ON signal indicated by 23a of the pulse signal generated by the pulse substrate 14 and the pulse contact pieces 15, 16. When the release button, not shown, of the camera is then depressed, the measurement of the object distance is effected by a conventional distance measuring device, not shown, for measuring the object distance, and when the obtained object distance is judged to be far than a prescribed distance, the zoom lens barrel remains unoperated, that is, the opening and closing of a shutter is effected in a cam area (any one of the ranges of 20a in FIG. 7) continuing to focus on the object at the far point, to thereby execute the photographing operation. Thereby, even if the stop position during focus control becomes irregular, in other words, if the two-unit lens is stopped within any one of the ranges of 20a in FIG. 7, photographing focused on the object at the far point can be effected in spite of this camera being a camera of a simple construction.

On the other hand, when the object distance is judged to be nearer than the prescribed distance, the zoom motor, not shown, is driven, whereby the zoom lens barrel is axially moved, that is, axially moved to a cam area (any one of the ranges of 20b in FIG. 7) continuing to focus on the object at the near point, and the OFF signal of the pulse signal 23b generated by the pulse substrate 14 and the pulse contact pieces 15, 16 is detected to thereby stop the zoom lens barrel, whereafter the opening and closing of the shutter is effected to thereby execute the photographing operation. Thereby, even if the stop position during focus control becomes irregular, in other words, if the zoom lens barrel is stopped within any one of the ranges 20b in FIG. 7, photographing focused on the object at the near point can be effected.

Likewise in other zoom position, when the tele button of the zoom button, not shown, of the camera is depressed, for example, from the wide position, the zoom lens barrel is driven in the tele direction, and when the zoom button is released on this side of an intermediate position indicated by M1, the zoom lens barrel is stopped by the ON signal of a pulse signal 23c, and the two-unit lens barrel 6 (two-unit lens 2) of the zoom lens is stopped within a range indicated by 20c. When here, the object distance is the far point, the photographing operation is intactly performed, and when the object distance is the near point, the zoom lens barrel is operated and is stopped by the OFF signal of a pulse signal 23d, and the two-unit lens 2 is stopped within a range indicated by 20d and the photographing operation is performed.

Even if in the stop control during zoom driving as described above, the irregularity of the stop position of the zoom lens is caused by the inertia of a zoom driving mechanism, the delay of a chattering absorption circuit during the detection of the OFF signal, any change in the temperature environment of the camera, etc., the driving ring 7 has a cam area free of a change in the focus if within a certain range, as previously described, and therefore even if accurate stop control is not effected, and even if the camera is not provided with a control circuit making complicated control possible, an in-focus photograph can be taken.

Second Embodiment

A second embodiment of the present invention will now be described with reference to FIGS. 8 to 10.

Figure 8:
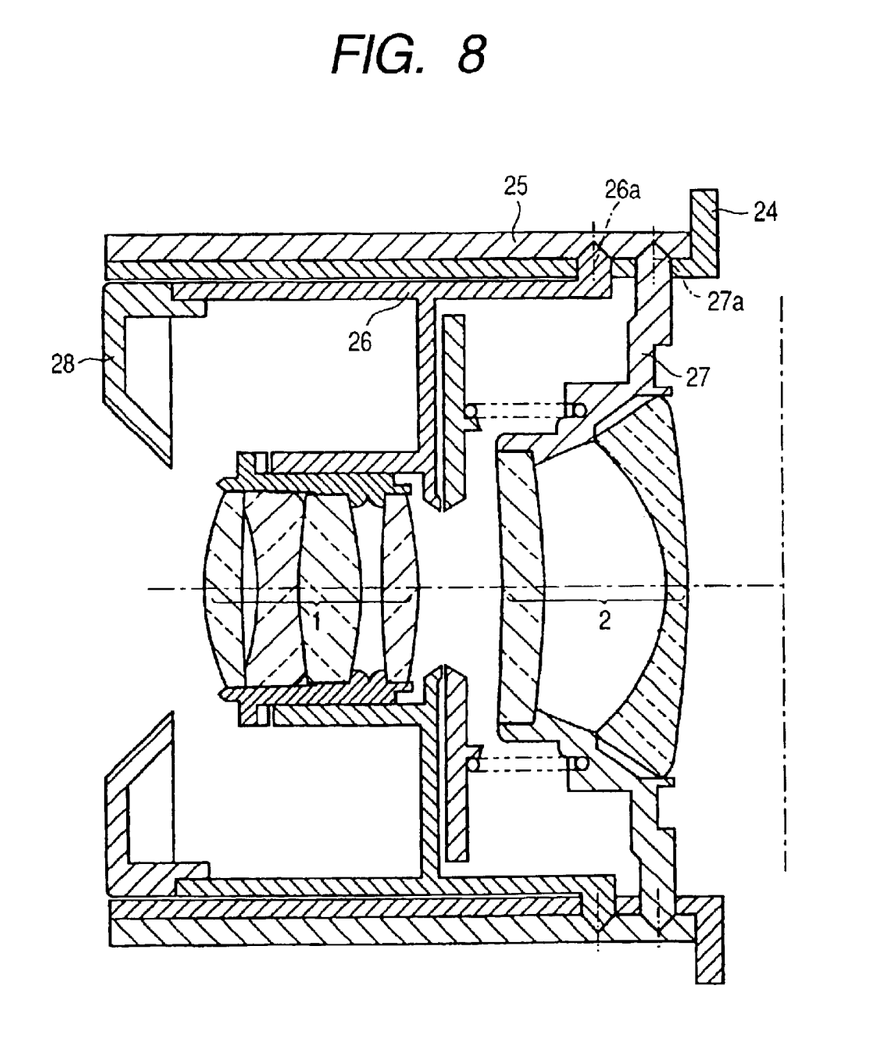
FIG. 8 is a longitudinal cross-sectional view showing the collapsed position of lens barrels according second to fourth embodiments of the present invention.

FIG. 8 is a cross-sectional view showing the waiting state (collapsed position) of the zoom lens barrel of a camera according to the second embodiment of the present invention, and a zoom lens and a holding mechanism therefore are similar to those in the above-described first embodiment and need not be described.

The differences of the present embodiment from the above-described first embodiment will hereinafter be described. In FIG. 8, the reference numeral 24 designates a stationary barrel, and the reference numeral 25 denotes a driving ring rotatably mounted on the stationary barrel 24. The reference numeral 26 designates a one-unit zoom lens barrel having three arm portions 26a disposed on the outer periphery of the rear thereof at intervals of 120 degrees, and having its rotation restricted by the stationary barrel 24, and having the tip ends of its arm portions 26a engaged with a cam provided on the driving ring 25. The reference numeral 27 denotes a two-unit lens barrel having three arm portions 27a disposed on the outer periphery thereof at intervals of 120 degrees, and like the one-unit zoom lens barrel 26, this two-unit lens barrel 27 has its rotation regulated by the stationary barrel 24, and has the tip ends of its arm portions 27a engaged with the cam-provided on the driving ring 25.

Figure 9:
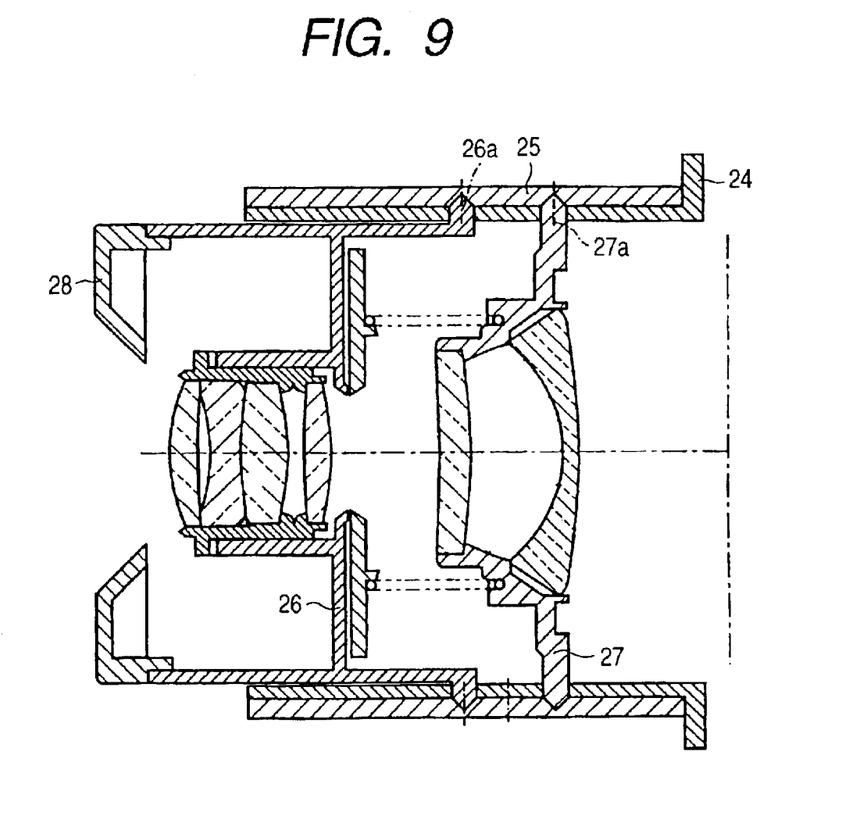
FIG. 9 shows the wide state of the lens barrels of FIG. 8.
Figure 10:
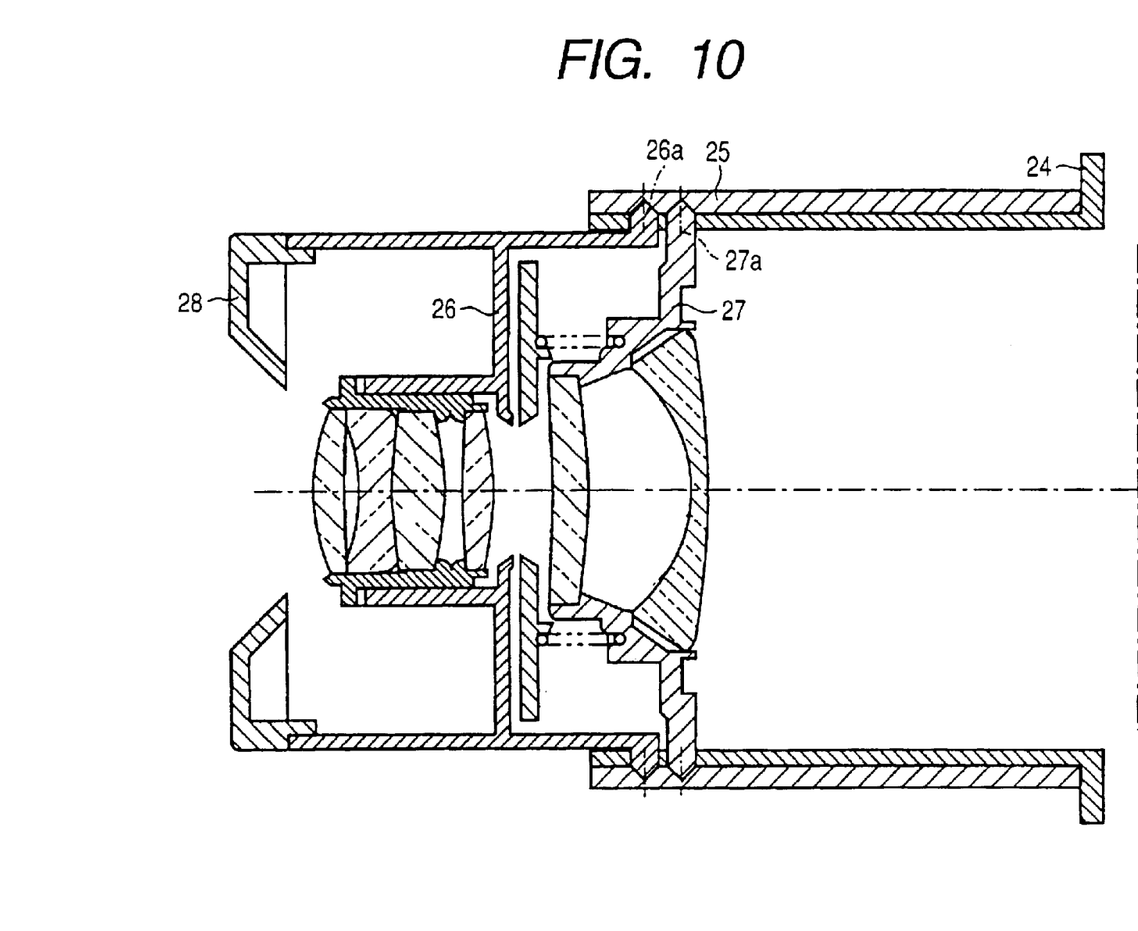
FIG. 10 shows the tele state of the lens barrels of FIG. 8.

With such construction, when the driving ring 25 is rotated, the one-unit zoom lens barrel 26 and the two-unit zoom lens barrel 27 are axially moved by cams provided on the inner surface of the driving ring 25, and are operated to a wide state shown in FIG. 9 or a tele state shown in FIG. 10. By adapting such construction, the one-unit lens 1 and the two-unit lens 2 can be driven independently of each other. The reference numeral 28 designates the cover of the zoom lens barrel 26.

The second embodiment will now be described with reference to FIG. 11.

Figure 11:
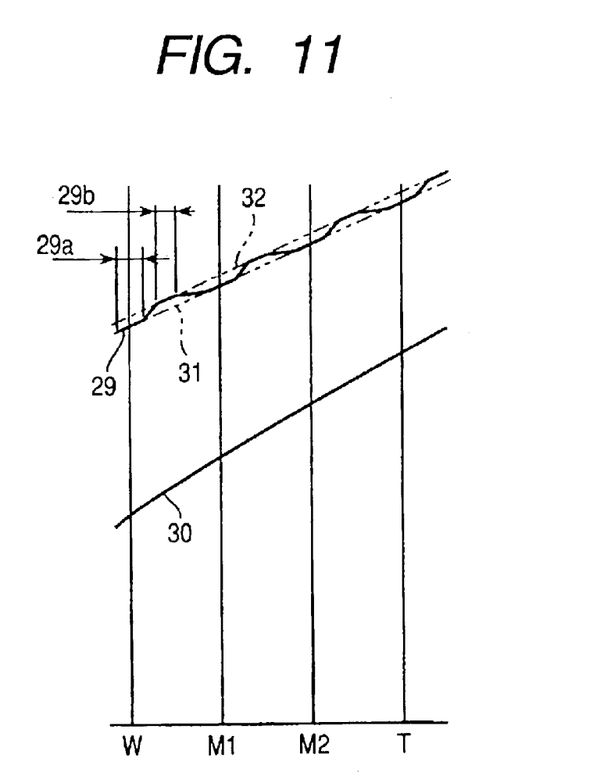
FIG. 11 shows the operations of a one-unit lens and a two-unit lens according to the third embodiment of the present invention.

In FIG. 11, the reference numeral 29 denotes a line indicating the operation locus of the one-unit lens 1, and the reference numeral 30 denotes a line indicating the operation locus of the two-unit lens 2. The line 29 and the line 30 indicate the shapes of the aforedescribed cams provided on the inner surface of the driving ring 25, and three cams of the same shape are formed on the inner surface of the driving ring 25 at intervals of 120 degrees, and they are engaged with the arm portion 26a of the one-unit zoom lens barrel 26 and the arm portion 27a of the two-unit lens barrel 27, respectively, and by the rotation of the driving ring 25, the one-unit zoom lens barrel 26 and the two-unit lens barrel 27 are axially moved. Also, as in the above-described first embodiment, W indicates the wide position, T indicates the tele position, and M1 and M2 indicate zoom stop positions at the intermediate positions thereof.

A dots-and-dash line 31 shown as being superimposed on the line 29 of the operation locus of the one-unit lens is a zoom cam curve when contrivance is not made as in the present embodiment, and is a line designed to be focused on the object at the far point. Likewise, a dots-and-dash line 32 is a zoom cam curve designed to be focused on the object at the near point, and is a line designed to be focused at a near distance shorter in object distance than the line 31. The line 29 of the operation locus of the one-unit lens is a line obtained by alternately linking the line 31 and the line 32 together.

By adopting such construction, as in the above-described first embodiment, if for example, at the wide end, if the one-unit lens is stopped within any one of the ranges 29a of the line 29 of the operation locus of the one-unit lens, the camera can be focused on the object at the far point, and if the one-unit lens is stopped within any one of the ranges 29b, the camera can be focused on the object at the near point.

The operation of the present embodiment is similar to that of the above-described first embodiment and therefore need not be described.

This construction has the advantage that in the characteristic of the two-unit zoom lens, the cam of the one-unit lens is straight and the amount of operation when it is axially moved to the near point is the same even if the zoom position is changed and therefore, the cam is easy to make.

Third Embodiment

A third embodiment of the present invention will now be described with reference to FIG. 12. In the present embodiment, the construction of the zoom lens barrel of the camera is similar to that shown in FIGS. 8 to 10, and the operation thereof is similar to that of the above-described first embodiment, and need not be described in detail.

Figure 12:
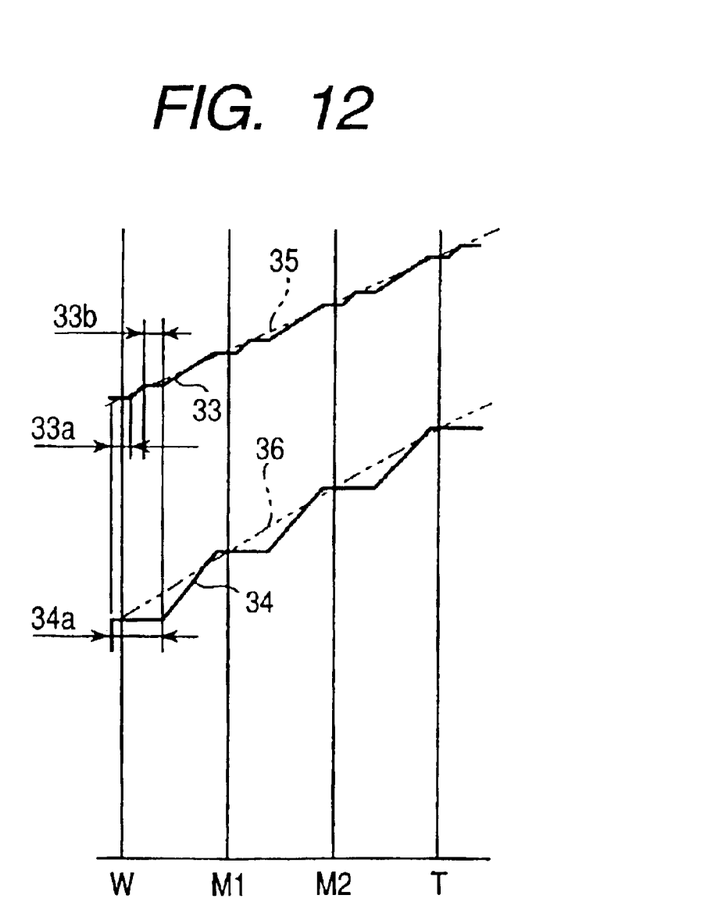
FIG. 12 shows the operations of a one-unit lens and a two-unit lens according to the fourth embodiment of the present invention.

In FIG. 12, the reference numeral 33 designates a line indicating the operation locus of the one-unit lens, and the reference numeral 34 denotes a line indicating the operation locus of the two-unit lens. As in the aforedescribed second embodiment, the line 33 and the line 34 indicate the shapes of cams provided on the inner surface of the driving ring 25, and three cams of the same shape are formed on the inner surface of the driving ring 25 at intervals of 120 degrees, and they are engaged with the arm portion 26a of the one-unit zoom lens barrel 26 and the arm portion 27a of the two-unit lens barrel 27, respectively, and by the rotation of the driving ring 25, the one-unit zoom lens barrel 26 and the two-unit lens barrel 27 are axially moved. Also, as in the above-described first embodiment, W indicates the wide position, T indicates the tele position, and M1 and M2 indicate zoom stop positions at the intermediate position thereof.

A dots-and-dash line 35 shows as being superimposed on the line 33 of the operation locus of the one-unit lens, and a dots-and-dash line 36 shown as being superimposed on the line 34 of the operation locus of the two-unit lens are zoom cam curves when contrivance is not made as in the present embodiment, and are lines designed to be focused on the object at the far point.

By adapting such construction, describing with respect, for example, to the wide end, the two-unit lens has a cam area which does not change its position within a predetermined range indicated by 34a from the stop position of the wide end, and therebetween, the one-unit lens has a cam area which nor changes its position within a range indicated by 33a, and at this position, it is focused on the object at the far point, and has a cam area which likewise does not change its position, within a range indicated by 33b, and at this position, it is designed to be focused on the object at the near point.

The construction of the third embodiment of the present invention, as compared with that of the above-described first and second embodiments, has the advantage that during photographing, the position of the two-unit lens does not change and therefore there is no change in image magnification.

While in each of the above-described embodiments, there is supposed a camera having two lens units 1 and 2, this is not restrictive, but the present invention can equally be applied to a camera of a construction in which zoom position adjustment and focus adjustment are effected by three or more lens units. Again in this case, the position control of the lens unit concerned in focus adjustment can be effected as shown in FIG. 6, FIG. 11 or FIG. 12.

Also, while there has been shown an example provided with the driving ring 7, having a cam area which can be focused on an object at a distance farther than a prescribed object distance with the prescribed object distance as the reference, and a cam area which can be focused on an object at a distance nearer than the prescribed object distance, there may be adopted a construction having a driving ring having such a cam area as can be focused on each of objects on a far point side and a near point side with each of a plurality of predetermined different object distances as the reference. That is, the positions for focus adjustment need not be two points, but may be three or more points.

According to each of the above-described embodiments, the camera has a zoom lens comprising a plurality of lens units (1, 2), and a lens driving member (in FIGS. 1, 4A, 4B and 4C, 6 and 7) for operating the plurality of lens units for the adjustment (control) of zoom and focus, and the lens driving member has at least a first area continuing to focus on a first object distance (e.g. an area continuing to stop a driving ring within the range 20a in FIG. 7) and a second area continuing to focus on a second object distance (e.g. an area continuing to stop the driving ring within the range 20*b* in FIG. 7), within a predetermined range in the operating process of the plurality of lens units for the zoom.

More particularly, the lens driving member has a zoom cam (such as 7*a* of the driving ring 7) having at least a first cam area continuing to focus on the first object distance (e.g. an area continuing to stop the driving ring within the range 20*a* in FIG. 7) and a second cam area continuing to focus on the second object distance (e.g. an area continuing to stop the driving ring within the range 20*b* in FIG. 7), within a predetermined range in the operating process of the plurality of lens units for the adjustment of the zoom, and the first cam area and the second cam area are alternately continuously provided.

The first area and the second area are provided so as to be capable of being alternatively selected at a changeable over zoom position. More particularly, describing with reference to FIG. 7, for example, at the zoom position of the wide (W), each of the range 20*a* continuing to focus on the object at the far point and the range 20*b* continuing to focus on the object at the near point (cam areas) are made capable of being selected.

Consequently, by a simple construction in which areas (cam areas) continuing to focus alternately on the objects at the far point and the near point are provided within a predetermined range, the focus adjustment of the zoom lens barrel can be effected, and even if the stop position of the zoom lens barrel becomes irregular, the zoom lens can be focused on a predetermined object distance (an object distance on the far point side or the near point side relative to a prescribed object distance) and therefore, the control circuit thereof can be simplified and the detection of the position of the zoom lens barrel (the detection of the rotated position of the motor) can also be simplified, and there can be provided a lens device or a zoom camera which is low in cost.

As has been described above, according to the art described herein, even if the stop position during focus adjustment becomes irregular, the camera can be focused on an object and also, the circuit construction for focus adjustment can be simplified. Thus, there can be provided the lens device of a camera or a zoom camera which is low in cost.

The present invention is not restricted to the above-described embodiments, but various changes and modifications are possible within the spirit and scope of the present invention. Therefore, in order to apprise the public of the scope of the present invention, the following claims are made.

What is claimed is:

1. A zoom lens device comprising:

a first lens unit, a second lens unit disposed on an optical axis rearwardly of said first lens unit;

a lens barrel including said first lens unit and said second lens unit; and a lens driving member for driving said first lens unit and said second lens unit for the adjustment of zoom and focus;

wherein said lens driving member has at least first and second zoom driving areas, and said first zoom driving area and said second zoom driving area have at least a first driving area for focusing on a first object distance and a second driving area for focusing on a second object distance shorter than said first object distance, respectively while driving said first lens unit and said second lens unit.

2. A zoom lens device of a camera comprising:

a first lens unit;

a second lens unit disposed on an optical axis rearwardly of said first lens unit; and a lens driving member for operating said first lens unit and said second lens unit for the adjustment of zoom and focus;

wherein said lens driving member has a zoom cam having at least a first cam area for focusing on a first object distance and a second cam area for focusing on a second object distance on a shorter distance side than said first object distance, within a predetermined range in the operating process of said plurality of lens units for said zoom adjustment, and said first cam area and said second cam area are alternately continuously provided on said zoom cam.

3. A zoom lens device of a camera according to claim 2, wherein said first area and said second area are provided so as to be capable of being alternatively selected at a zoom position which is changeable over.

4. A zoom camera having A zoom lens device according to claim 3, and a distance measuring unit for measuring an object distance, and wherein when at a desired zoom position, a current object distance obtained by said distance measuring unit is included in said first object distance, one of said plurality of lens units is set in said first area of said zoom cam through said lens driving member, and when the current object distance is included in said second object distance, one of said plurality of lens units is set in said second area through said lens driving member, thereby effecting focus adjustment.

5. A zoom camera having A zoom lens device according to claim 3, and distance measuring means for measuring an object distance, and wherein when said plurality of lens units are operated to a desired zoom position, one of said plurality of lens units which is used for focus adjustment is located in said first area, and when a current object distance during photographing is included in said first object distance, a photographing operation is immediately executed, and when the current object distance during photographing is included in said second object distance, the lens used for said focus adjustment is operated from said first area to said second area through said lens driving member to thereby execute the photographing operation.

* * * * *